United States Patent [19]

Decroix

[11] Patent Number: 4,472,475

[45] Date of Patent: Sep. 18, 1984

[54] METAL COATED WITH A LAYER OF POLYMER FILM AND A PROCESS FOR ITS PRODUCTION

[75] Inventor: Jean-Claude Decroix, Arras, France

[73] Assignee: Societe Chemique des Charbonnages—CdF Chimie, Paris la Defence, France

[21] Appl. No.: 374,754

[22] Filed: May 4, 1982

[30] Foreign Application Priority Data

May 12, 1981 [FR] France ................ 81 09386

[51] Int. Cl.$^3$ .................. B32B 7/02; B32B 15/08
[52] U.S. Cl. .................. 428/215; 156/244.11; 264/205; 427/409; 428/332; 428/457; 428/461
[58] Field of Search ............. 428/461, 215, 332, 457; 427/409; 156/244.11; 264/205

[56] References Cited

U.S. PATENT DOCUMENTS 4,032,692  6/1977  Birnkrant et al. ........... 428/463 X

FOREIGN PATENT DOCUMENTS 1323379  2/1963  France ........................ 428/461
991,568  5/1965  United Kingdom ............. 428/461

*Primary Examiner*—Thomas J. Herbert
*Attorney, Agent, or Firm*—Finnegan, Henderson, Farabow, Garrett & Dunner

[57] ABSTRACT

Metal coated with a polymer film having a thickness between 10 and 500 μm. The film is a terpolymer comprising 88 to 98.7 mole % of units derived from ethylene, from 1 to 10 mol % of units derived from an alkyl (meth)-acrylate, and from 0.3 to 3 mol % of units derived from maleic anhydride, and optionally may contain up to 5 mol % of units derived from a fourth monomer selected from α-olefins having from 3 to 8 carbon atoms, monoalkyl maleates and dialkyl maleates in which the alkyl groups have from 1 to 6 carbon atoms, vinyl acetate, and carbon monoxide. The terpolymer film has a melt index of between 2 and 10 dg/minute. The metal substrate is coated with the terpolymer film at a temperature between 140° C. and 300° C., the speed of travel of the metal substrate being between 40 to 400 meters per minute.

9 Claims, No Drawings

METAL COATED WITH A LAYER OF POLYMER FILM AND A PROCESS FOR ITS PRODUCTION

BACKGROUND OF THE INVENTION

The present invention relates to the coating of metals with a polymer film.

In several applications, it is necessary to coat a metal with a polymer film of low thickness, the metal being in the form of a plate or sheet. The properties of the polymeric material required for such applications are essentially the peel strength, on the one hand, and the strength of the seals produced by hot sealing, on the other hand. The polymeric materials commonly used because of their good properties in these applications are ethylene ionomers, i.e. terpolymers of ethylene, methacrylic acid, and an alkali metal methacrylate or zinc methacrylate. Furthermore, U.S. Pat. No. 4,032,692 discloses a process for coating materials by applying to a substrate a molten terpolymer comprising, for 100 parts by weight, from 70 to 90 parts of ethylene, from 0.5 to 10 parts of an ethylenically unsaturated carboxylic acid amide and from 0.5 to 20 parts of an ethylenically unsaturated carboxylic acid ester.

SUMMARY OF THE INVENTION

The object of the present invention is a new polymeric film for coating metals having improved properties for such applications, and a process for carrying out coating with this new film.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the product of the invention comprises metal coated with a layer of polymer film having a thickness of between 10 and 500 $\mu$m, the film comprising a terpolymer comprising from 88 to 98.7 mol % of units derived from ethylene, from 1 to 10 mol % of units derived from an alkyl (meth)-acrylate and from 0.3 to 3 mol % of units derived from maleic anhydride, and having a melt index of between 2 and 10 dg/minute.

DESCRIPTION OF THE PREFERRED EMBODIMENTS

Reference will now be made in detail to the presently preferred embodiments of the invention.

Some terpolymers usable within the scope of the present invention have been disclosed in French Patent No. 1,323,379. Particular terpolymers also usable, more particularly characterized by their polydispersity index greater than 6 and their Vicat temperature of between 30 and 85° C., have been disclosed in French patent application No. 81/01,430 in the name of the applicant. The French patent and application are incorporated herein by reference.

The process for the manufacture of those terpolymers comprises copolymerizing, in the presence of at least one free radical initiator, a mixture composed of 94 to 99% by weight of ethylene, 0.7 to 5% by weight of (meth)-acrylic acid ester and 0.2 to 0.9% by weight of maleic anhydride, in a reactor kept under a pressure of 1,000 to 3,000 bars and at a temperature of 170° to 280° C., in releasing and then in separating the mixture of monomers and the terpolymer formed in the reactor, and finally in recycling, into the reactor, the mixture of ethylene and monomers previously separated off, the recycled stream comprising from 99 to 99.8% of ethylene and from 0.2 to 1% of meth-(acrylic) acid ester.

Optionally, the terpolymer can comprise a fourth monomer which is copolymerizable with the first three monomers. This fourth monomer can be selected from $\alpha$-olefins having from 3 to 8 carbon atoms, monoalkyl maleates and dialkyl maleates, in which the alkyl groups have from 1 to 6 carbon atoms, vinyl acetate, and carbon monoxide, and can be present in an amount of up to 5 mol %, the proportion of ethylene in the tetrapolymer then being reduced accordingly, relative to the range indicated above.

If necessary, the terpolymer used within the scope of the present invention may have been treated beforehand with a molar amount, at most equal to the molar amount of units derived from maleic anhydride, of a reactant selected from ammonia and compounds having a primary or secondary amine group.

Films having a thickenss of between 10 and 500 $\mu$m are obtained from these terpolymers through a flat die, in a known manner.

The invention also relates to a process for the production of a coated metal such as described above, which comprises coating a metal substrate with the polymer film at a temperature between 140° C. and 300° C., the speed of travel of the metal substrate being between 40 and 400 meters per minute. The metal is preferably selected from the group comprising aluminum and steel. The metal substrate is preferably in the form of a plate, sheet, or tube having a thickness of at least 25 $\mu$m.

Metals coated according to the invention have significant properties that are improved compared with metals coated according to the state of the art referred to above. Firstly, their peel strength is at least equivalent to that obtained by means of ethylene ionomers and is better equilibrated in the longitudinal and transverse directions. Secondly, the strength of the seals is substantially improved compared with ethylene ionomers, for sealing temperatures ranging from 100° C. up to more than 150° C., and it remains satisfactory at the relatively low sealing temperatures that are generally sought for increasing production rates.

Metals coated according to the invention have varied and widespread applications. For example, aluminum films coated according to the invention can be used in the food packaging industry for keeping foodstuffs protected from moisture and preserving their aroma. As another example, the coating process according to the invention can be applied to steel pipes, such as pipes for conveying petroleum or gases, making it possible to protect these pipes against oxidation and shocks. In this case it is preferred that the terpolymer film be covered with a layer of polyethylene containing a filler such as carbon black.

The object of the examples which follow is to illustrate the invention without implying a limitation.

EXAMPLES 1 AND 2—MANUFACTURE OF TERPOLYMERS

A cylindrical autoclave reactor was used that comprised three zones, each having a volume of 1 liter, and was equipped with a blade stirrer. The zones were separated by valve screens. Fresh ethylene, compressed by a first compressor, fed the first zone. The second zone was fed with a homogeneous mixture of ethylene, maleic anhydride (MA), and ethyl acrylate (EA). Finally, a solution of tert -butyl 2-ethyl-perhexanoate in a hydrocarbon fraction was injected into the third zone. The latter thus constituted the only reaction zone because it brought the three comonomers into contact with a free radical initiator. Table I below shows, on the one hand, the proportions by weight of maleic anhydride and ethyl acrylate, relative to the ethylene in the reaction zone, and, on the other hand, the temperature in the reaction zone. The reactor was kept under a pressure of 1,600 bars. At the bottom of the third zone of the reactor, there was a relief valve making it possible to lower the pressure to 300 bars. After it had passed through the relief valve, the mixture of the molten polymer, on the one hand, and the gaseous monomers, on the other hand, passed into a separating hopper. While the polymer was collected at the bottom of the hopper, the monomers were led into a second compressor, after they had passed through a degreasing hopper. Furthermore, a solution of maleic anhydride in ethyl acrylate was pumped in under pressure and led towards the inlet of a Venturi-type homogenizer, where it was mixed with the stream of recycled monomers orginating from the second compressor. On leaving this Venturi device, the mixture of the three monomers was led towards a spiral-type homogenizer and then transferred to the second zone of the reactor.

On leaving the separating hopper, the terpolymer produced was analyzed by infra-red spectrophotometry and the molar proportions of ethyl acrylate units and maleic anhydride units were determined, these being indicated in Table I below. Furthermore, the melt index (M.I.) of the polymer was determined according to ASTM Standard Specification D 1238-73 and is expressed in dg/minute.

TABLE I

| | | Reactor | | Polymer | | |
|---|---|---|---|---|---|---|
| Example | T°C. | % of MA | % of EA | % of MA | % of EA | M.I. |
| 1 | 185 | 0.35 | 3.0 | 1.0 | 3.3 | 6.4 |
| 2 | 230 | 0.25 | 0.85 | 0.4 | 1.3 | 3.8 |

EXAMPLES 3 (COMPARISON), 4, AND 5—COATING OF ALUMINUM

A 25 μm thick film was formed through a flat die and used to coat, at a temperature of 265° C. (comparison example 3) or of 250° C. (example 4 according to the invention) an aluminum sheet travelling at a speed of 40 meters per minute. The film of example 3 consisted of a terpolymer comprising 90 mol % of units derived from ethylene, 3 mol % of units derived from methacrylic acid and 7 mol % of units derived from zinc methacrylate, marketed under the trademark SURLYN. The film of example 4 consisted of the terpolymer of example 1. The following were measured on the aluminum sheets coated in this way:

The peel strength in the longitudinal direction (L.P.S.) and transverse direction (T.P.S.) according to ASTM Standard Specification D 903-49, modified as regards the width of the polymer strip (35 mm instead of 25 mm) and expressed in grams; and The strength of the seals, S.S., according to French Standard Specification K 03-004, modified as regards the width of the polymer strip (35 mm instead of 15 mm) and expressed in kilograms. This strength can be measured for seals produced by electrodes at different temperatures.

The results of these measurements are shown in Table II below.

TABLE II

| Example | L.P.S. | T.P.S. | S.S. 150° C. | S.S. 100° C. |
|---|---|---|---|---|
| 3 | 260 | 460 | 0.3 | 1.8 |
| 4 | 360 | 390 | 0.7 | 2.2 |

The film of example 5 consisted of the terpolymer of example 2. On the aluminum sheet coated in this way, the strength of the seals made at 100° C., measured as above, is equal to 2.4 kg.

It will be apparent to those skilled in the art that various modifications and variations could be made in the product of the invention without departing from the scope or spirit of the invention.

What is claimed is:

1. Metal coated with a layer of polymer film having a thickness of between 10 and 500 μm, said film consisting essentially of a polymer comprising from 88 to 98.7 mol % of units derived from ethylene, from 1 to 10 mol % of units derived from an alkyl (meth)-acrylate, from 0.3 to 3 mol % of units derived from maleic anhydride, and up to 5 mol % of units derived from a monomer selected from the group consisting of α-olefins having from 3 to 8 carbons atoms, monoalkyl maleates and dialkyl maleates in which the alkyl groups have from 1 to 6 carbon atoms, and vinyl acetate, and carbon monoxide, and having a melt index of between 2 and 10 dg/minute.

2. Coated metal according to claim 1, wherein said metal is selected from the group consisting of aluminum and steel.

3. Coated metal according to claim 1 or 2, wherein said metal is in the form of a plate, sheet, or tube and has a thickness of between 25 and 500 μm.

4. Coated metal according to claim 1 or 2, wherein the polydispersity index of the polymer is greater than 6.

5. Coated metal according to claim 1 or 2, wherein the Vicat temperature of the polymer lies between 30° and 85° C.

6. Coated metal according to claim 1 or 2, wherein said polymer is treated beforehand with an amount, at most equal to the molar amount of units derived from maleic anhydride, of a reactant selected from ammonia and compounds having a primary or secondary amine group.

7. Coated metal according to claim 1, wherein said coated metal consists essentially of said metal coated with said layer of polymer film.

8. Process for the production of a coated metal according to claim 1, comprising coating a metal substrate with said polymer film at a temperature between 140° C. and 300° C., the speed of travel of said metal substrate being between 40 and 400 meters per minute.

9. Process according to claim 8, wherein said polymer film is obtained through a flat die.

* * * * *

UNITED STATES PATENT AND TRADEMARK OFFICE
CERTIFICATE OF CORRECTION

PATENT NO. : 4,472,475
DATED : September 18, 1984
INVENTOR(S) : JEAN-CLAUDE DECROIX It is certified that error appears in the above-identified patent and that said Letters Patent is hereby corrected as shown below:

Change "Societe Chemique des Charbonnages CdF Chimie" to

--Societe Chimique des Charbonnages-CdF Chimie--.

Signed and Sealed this

Fifteenth Day of January 1985

[SEAL]

Attest:

GERALD J. MOSSINGHOFF

Attesting Officer      Commissioner of Patents and Trademarks